April 13, 1965
J. W. CLARK
3,178,468
REMOVAL OF MERCAPTANS AND PREPARATION OF
S,S,S-TRINORMAL BUTYL TRITHIOPHOSPHATE
Filed Dec. 11, 1961
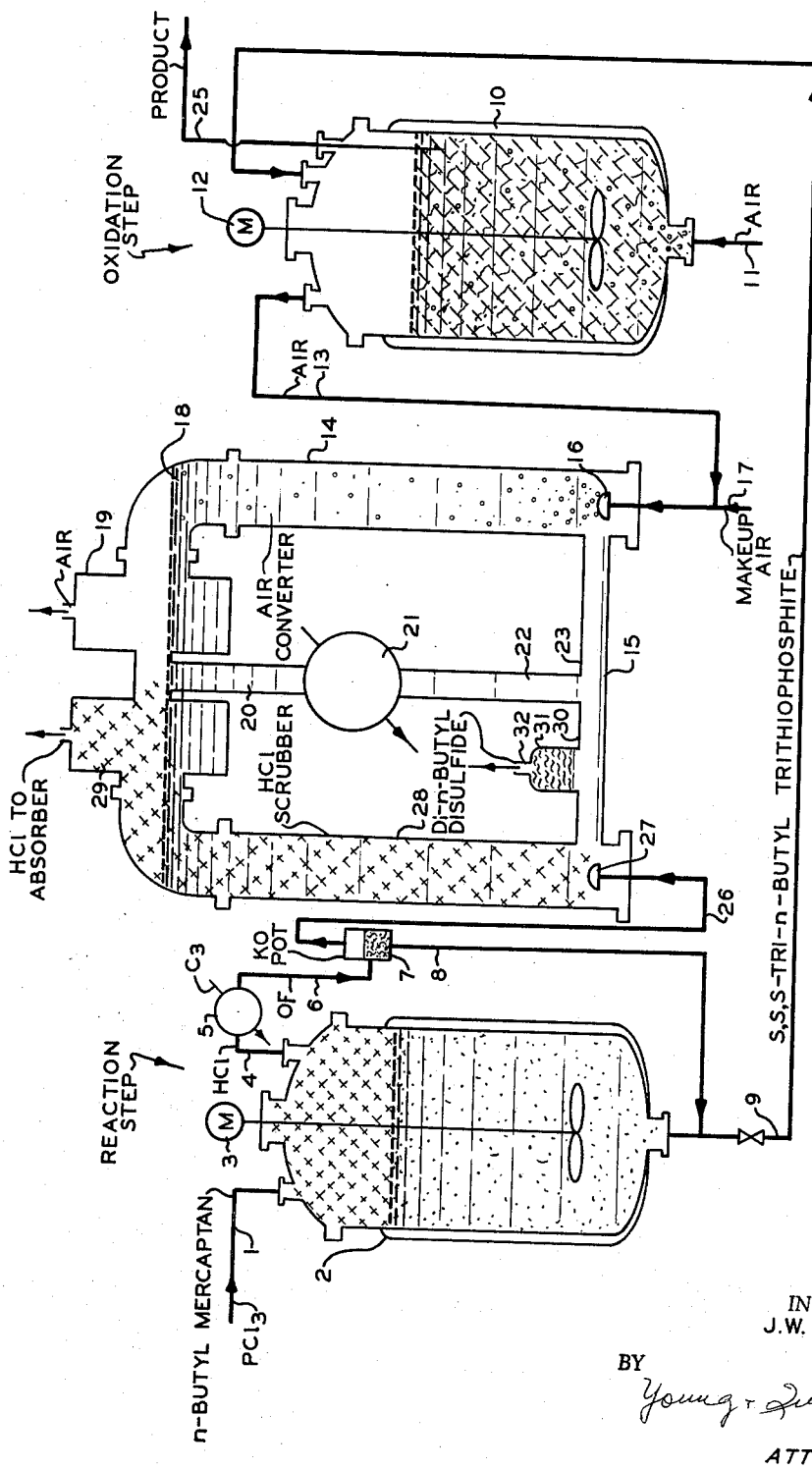
INVENTOR.
J.W. CLARK
BY
*Young + Quigg*
ATTORNEYS

United States Patent Office 3,178,468
Patented Apr. 13, 1965

3,178,468
REMOVAL OF MERCAPTANS AND PREPARATION OF S,S,S-TRINORMAL BUTYL TRITHIOPHOSPHATE
Joseph W. Clark, Phillips, Tex., assignor to Phillips Petroleum Company, a corporation of Delaware
Filed Dec. 11, 1961, Ser. No. 158,215
3 Claims. (Cl. 260—461)

This invention relates to the removal of mercaptans. It also relates to an improved process for the preparation of S,S,S-trinormal butyl trithiophosphate.

In one of its aspects the invention relates to the removal of mercaptan from hydrogen chloride-containing gases resulting from the preparation of S,S,S-trinormal butyl trithiophosphate by a reaction of n-butyl mercaptan and phosphorous trichloride, the removal of the mercaptan being effected by contacting off gases in a scrubber with a liquid copper chloride reagent. In another of its aspects the invention relates to a combination operation wherein S,S,S-trinormal butyl trithiophosphate is prepared from n-butyl mercaptan and phosphorous trichloride, yielding an off gas containing HCl and some n-butyl mercaptan, which is treated for butyl mercaptan removal as already described, and wherein air from an oxidation step wherein S,S,S-tri-n-butyl trithiophosphite, first obtained, is oxidized to the corresponding phosphate, is employed to convert cuprous chloride formed during the mercaptan removal to cupric chloride.

During the manufacture of S,S,S-trinormal butyl trithiophosphate, which is pre-eminently useful as cotton defoliant, the hydrogen chloride off-gas and unused air which are liberated contain small quantities, usually about 6–8 percent at 100° F., of normal butyl mercaptan. The quantity of normal butyl mercaptan can be reduced to less than about 1 percent by cooling gaseous hydrogen chloride-containing stream to 0° F., thus recovering, in a knockout pot, liquid normal butyl mercaptan. This liquid normal butyl mercaptan is returned to the reactor. However, the normal butyl mercaptan in the hydrogen chloride stream, albeit it is now a very small quantity, relatively speaking, presents still a serious odor problem. Thus, if the hydrogen chloride is absorbed in water, the water cannot be sent to open pits or drainage because of the contained normal butyl mercaptan. Further, if caustic is used to neutralize the hydrogen chloride, a mercaptide of normal butyl mercaptan is formed which also has an offensive odor. Thus, treating off-gas with caustic does not completely eliminate an offensive or bad odor which can be a nuisance and which can cause city officials concern.

It has now occurred to be that if I send all of the HCl off-gas and excess air stream obtained in the preparation of S,S,S-trinormal butyl trithiophosphate, prepared from phosphorous trichloride and normal butyl mercaptan to form the S,S,S-tri-n-butyl trithiophosphite, which is later oxidized with air to the corresponding S,S,S-trinormal butyl trithiophosphate, to a converter wherein there is circulated a liquid copper chloride reagent I can convert the normal butyl mercaptan in the HCl off-gas to dinormal butyl disulfide which can be removed from the system, and can use the excess air to oxidize cuprous chloride to cupric chloride, as further described herein. In one form of the invention and in a specific embodiment thereof, apparatus employed, as shown in the drawing herein, has the general form of two substantially vertical legs connected at their tops and at their bottoms with a connection between the connection at the top and the connection at the bottom. Essentially, the apparatus can have the general configuration of a figure 8 lying on its side. There is circulated through the entire apparatus the liquid copper chloride reagent employed according to the invention. Into one vertical leg or side of the apparatus there is introduced the HCl off-gas containing normal butyl mercaptan. The mercaptan is converted, as stated, to dinormal butyl disulfide. The circulating reagent is injected in the other leg of the apparatus with excess air from the oxidation step, later more fully described, and here the cuprous chloride in the reagent is converted once again to cupric chloride. In the leg communicating between the top and bottom communications of the two legs there can be a temperature adjusting heat exchanger, and, finally, dinormal butyl disulfide is taken off from on top of the cupric chloride reagent as it passes through the communications from the one vertical leg of the apparatus to the other the regenerated copper chloride solution.

It is an object of this invention to remove mercaptans. It is another object of this invention to eliminate offensive odor caused by mercaptans. It is a further object of this invention to provide an improved modus operandi for the preparation of S,S,S-trinormal butyl trithiophosphate by a reaction of phosphorus trichloride and normal butyl mercaptan in which offensive odor due to traces or small quantities of normal butyl mercaptan is eliminated.

Other aspects, objects, and the several advantages of this invention are apparent from a study of this disclosure, the drawing, and the appended claims to the invention.

According to the present invention there is provided a process for the preparation of S,S,S-trinormal butyl trithiophosphate which comprises the steps as follow: Reacting phosphorous trichloride and normal butyl mercaptan in a reaction zone, removing from said reaction zone S,S,S-tri-n-butyl trithiophosphite, in an oxidation zone oxidizing the last mentioned material to S,S,S-trinormal butyl trithiophosphate, passing hydrogen chloride containing gas also containing unavoidably normal butyl mercaptan into a zone containing copper chloride reagent, in the last mentioned zone converting normal butyl mercaptan to dinormal butyl disulfide, passing the copper chloride reagent thus used to an air converter zone and therein converting cuprous chloride formed therein when converting the butyl mercaptan to dinormal butyl disulfide to cupric chloride using the air from said oxidation zone.

Referring now to the drawing, phosphorous trichloride and normal butyl mercaptan are introduced by 1 into reactor 2 equipped with stirrer 3. During the reaction hydrogen chloride containing gases, also containing unavoidably entrained mercaptan, are taken off at 4, passed through chiller 5 and by way of 6 into knockout pot 7. According to the invention, liquid from knockout pot 7, which is operated at about 0° F., is passed by 8 together with reaction mass containing S,S,S-tri-n-butyl trithiophosphite by 9 to oxidation reactor 10. Air is introduced at 11, the mass is stirred by stirrer 12, and excess air and entrained mercaptan are taken off by 13 and passed to right-hand leg 14 of copper chloride treater converter 15 by way of jet 16. Makeup air is introduced by 17, as desired. The upward motion of the air in leg 14 causes a lift action to take place. Thus the copper chloride solution in leg 14 passes upwardly through elbow 18, separator section 19, and downwardly through pipe 20, cooler 21, and pipe 22 into crossover pipe portion 23 and back into leg 14. The air introduced in the reactor 10 oxidizes the S,S,S-tri-n-butyl trithiophosphite to S,S,S-trinormal butyl trithiophosphate which is removed at 25.

Returning to knockout pot 7, overhead gas from the pot passes by 26 into jet or nozzle 27 and upwardly through copper chloride treating solution in left-hand leg 28 of the treater-converter. While passing upwardly through leg 28, mercaptan is converted to dinormal butyl disulfide and when the treating solution and gases reach the upper end of 28 hydrogen chloride is removed while the solution passes through separator section 29, the used treating solution passing downwardly through pipe 20 together with regenerated solution, as earlier described. As copper chloride solution passes across the bottom horizontal connection 30 dinormal butyl disulfide is collected at 31 and removed at 32.

*Example*

17,526 pounds of normal butyl mercaptan and 8,346 pounds of phosphorous trichloride, added over a period of 3 hours, reacted at about 95° F. until all of the phosphorous trichloride has been added and considerable HCl has been evolved. The reaction mass is then heated to about 300° F. to drive off additional HCl. The gaseous effluent from the reaction is chilled to about 0° F. and remaining gases are passed through a liquid knockout drum following which gases still remaining are passed to a copper chloride treating zone, for example as in the drawing, and therein treated aqueous copper chloride solution (cupric) producing 78 pounds of dinormal butyl disulfide from the mercaptan in the gaseous effluent so treated. S,S,S-tri-n-butyl trithiophosphite formed in the initial reaction is air blown at 230° F. for a period of about 5 hours converting the trithiophosphite to trithiophosphate. Air blowing is continued only until a product of 95 weight percent purity, in this example, is obtained. During air blowing unreacted mercaptan in the reaction mass is recovered therefrom. The residual and excess air thus obtained is then used to regenerate or oxidize the used copper chloride solution thus recovering additional mercaptan from said air in the form of dinormal butyl disulfide and regenerating the copper chloride treating solution at the same time. A total of 1,286 pounds of mercaptan are recovered in the operation.

If desired, the operation of the invention can be effected using a single reactor in which phosphorous trichloride is added to normal butyl mercaptan, the mass is heated to drive off HCl acid and mercaptan unavoidably coming off therewith, the gas is treated with copper chloride treating solution, the reaction mass neutralized with, say, sodium carbonate and air blown, the copper solution being regenerated during the air blowing step, during which step additional mercaptan is recovered.

Reasonable variation and modification are possible within the scope of the foregoing disclosure, drawing, and the appended claims to the invention the essence of which is that mercaptan in the reaction gases from the production of S,S,S-tri-n-butyl trithiophosphite from phosphorous trichloride and normal butyl mercaptan are freed of normal butyl mercaptan by treatment in a copper chloride treating solution containing zone and that the air from the conversion of the trithiophosphite obtained and converted by air blowing to trithiophosphate, and which air contains additional butyl mercaptan, is used to regenerate used copper treating solution, thus simultaneously recovering additional mercaptan in the form of dinormal butyl disulfide, substantially as described.

I claim:
1. A process for the preparation of S,S,S-tri-n-butyl trithiophosphite and converting the same to S,S,S-trinormal butyl trithiophosphate which comprises reacting phosphorous trichloride and normal butyl mercaptan forming the S,S,S-tri-n-butyl trithiophosphite and obtaining a gaseous effluent containing normal butyl mercaptan, passing said effluent into a copper chloride treating solution containing zone, therein converting normal butyl mercaptan to dinormal butyl disulfide, recovering said disulfide from said zone, air blowing the reaction mass containing the S,S,S-tri-n-butyl trithiophosphite to obtain and to recover S,S,S-trinormal butyl trithiophosphate as a product of the process, passing air from the air blowing step, the air now containing normal butyl mercaptan which remained in the S,S,S-tri-n-butyl trithiophosphite when formed, to the copper chloride treating zone to regenerate said copper chloride treating solution to convert cuprous chloride formed during the mercaptan removal to cupric chloride and to recover additional normal butyl mercaptan as dinormal butyl disulfide.

2. A process according to claim 1 wherein the gaseous effluent containing normal butyl mercaptan is chilled, condensed liquid is removed therefrom and the condensed liquid is treated together with the S,S,S-tri-n-butyl trithiophosphite during the air blowing step, thus recovering butyl mercaptan therein for further treatment as in said claim 1.

3. A process for the production of S,S,S-tri-n-butyl trithiophosphite which comprises in a first reaction zone reacting phosphorous trichloride and normal butyl mercaptan obtaining a gaseous effluent containing HCl and unreacted mercaptan, passing S,S,S-tri-n-butyl trithiophosphite thus obtained to a second reaction zone, therein blowing said S,S,S-tri-n-butyl trithiophosphite with air converting it to S,S,S,-trinormal butyl trithiophosphate and obtaining air containing normal butyl mercaptan remaining originally in the S,S,S-tri-n-butyl trithiophosphite when it was produced, circulating a copper chloride treating solution in a circulation zone, introducing said gaseous effluent into said circulation zone, also introducing said air containing normal butyl mercaptan into said circulation zone to oxidize cuprous chloride to cupric chloride and convert said normal butyl mercaptan to dinormal butyl disulfide and recovering dinormal butyl disulfide from said circulation zone.

References Cited in the file of this patent

UNITED STATES PATENTS

| | | |
|---|---|---|
| 767,335 | Evers | Aug. 9, 1904 |
| 1,576,705 | Babcock | Mar. 16, 1926 |
| 2,875,230 | Coover et al. | Feb. 24, 1959 |
| 2,943,107 | Rattenbury et al. | June 28, 1960 |

OTHER REFERENCES

Reid: "Organic Chemistry of Bivalent Sulfur," Chemical Publishing Co., Inc., New York, N.Y. (1958), vol. 1, pp. 113, 114, 118, 122.